United States Patent
Linton et al.

(10) Patent No.: US 9,724,734 B2
(45) Date of Patent: Aug. 8, 2017

(54) HIGH EFFICIENCY HOT WATER PRESSURE WASHER

(71) Applicant: Karcher North America, Inc., Denver, CO (US)

(72) Inventors: Paul W. Linton, Camas, WA (US); Gary G. Charlson, Camas, WA (US); Dana Sean Plummer, Yacolt, WA (US); Thomas E. Corsine, Troutdale, OR (US)

(73) Assignee: Kärcher North America, Inc., Denver, CO (US)

( * ) Notice: Subject to any disclaimer, the term of this patent is extended or adjusted under 35 U.S.C. 154(b) by 13 days.

(21) Appl. No.: 15/009,511

(22) Filed: Jan. 28, 2016

(65) Prior Publication Data

US 2016/0221044 A1    Aug. 4, 2016

Related U.S. Application Data

(60) Provisional application No. 62/110,158, filed on Jan. 30, 2015, provisional application No. 62/120,452, filed on Feb. 25, 2015.

(51) Int. Cl.
| | | |
|---|---|---|
| *B05B 1/24* | (2006.01) | |
| *B08B 3/02* | (2006.01) | |
| *F24H 8/00* | (2006.01) | |
| *B05B 9/00* | (2006.01) | |
| *B05B 7/16* | (2006.01) | |

(52) U.S. Cl.
CPC ............ *B08B 3/026* (2013.01); *B05B 7/1646* (2013.01); *B05B 9/002* (2013.01); *F24H 8/00* (2013.01); *B08B 2203/007* (2013.01); *Y02B 30/102* (2013.01)

(58) Field of Classification Search
CPC ....... B08B 1/24; B08B 2203/007; F24H 8/00; Y02B 30/102; B05B 9/002; B05B 7/1646
USPC ....... 239/146, 525, 530, 532, 124, 127, 128, 239/135, 139
See application file for complete search history.

(56) References Cited

U.S. PATENT DOCUMENTS

| | | | |
|---|---|---|---|
| 3,814,321 A | * | 6/1974 | Mulholland ............ F24H 1/165 239/135 |
| 4,142,496 A | | 3/1979 | Saito et al. |

(Continued)

FOREIGN PATENT DOCUMENTS

| | | |
|---|---|---|
| CA | 2380419 | 11/2001 |
| EP | 0740065 | 10/1996 |

(Continued)

OTHER PUBLICATIONS

Official Action for Canadian Patent Application No. 2919491, mailed Jan. 10, 2017, 4 pages.

*Primary Examiner* — Steven J Ganey
(74) *Attorney, Agent, or Firm* — Sheridan Ross PC

(57) ABSTRACT

An improved hot water pressure washer utilizes a combination of technologies to achieve lower emission levels and increased operational efficiency. A forced air natural gas or forced air oil burner utilizes a flue gas and recirculation line to lower carbon monoxide and NOx emissions from a burner. A flue gas heat exchanger is utilized to lower the temperature of the exhaust gas. The lower exhaust gas temperatures allow for lower cost materials to be utilized. The efficiency levels of a hot water pressure washer are increased over known devices.

20 Claims, 5 Drawing Sheets

(56) References Cited

U.S. PATENT DOCUMENTS

| | | | |
|---|---|---|---|
| 5,377,650 | A | 1/1995 | Warner |
| 5,713,310 | A | 2/1998 | Lemke |
| 5,954,494 | A | 9/1999 | Goldsmith et al. |
| 6,352,068 | B1 | 3/2002 | Jacobsen |
| 6,422,219 | B1 | 7/2002 | Savonen et al. |
| 6,681,564 | B2 | 1/2004 | Nishiyama et al. |
| 6,901,746 | B2 | 6/2005 | Nishiyama et al. |
| 7,827,782 | B2 | 11/2010 | Theis |
| RE42,609 | E | 8/2011 | Kurtz et al. |
| 8,061,283 | B2 | 11/2011 | Lewis |
| 8,960,565 | B2 * | 2/2015 | Rohner ............... B08B 3/02 239/135 |
| 2004/0050375 | A1 | 3/2004 | Arnold |
| 2007/0193254 | A1 | 8/2007 | Johannes |
| 2007/0220871 | A1 | 9/2007 | Zuberi |
| 2009/0157230 | A1 | 6/2009 | Hibshman II |
| 2010/0294459 | A1 | 11/2010 | Williams |
| 2011/0048372 | A1 | 3/2011 | Dibble |
| 2012/0042633 | A1 | 2/2012 | Silvestri |

FOREIGN PATENT DOCUMENTS

| | | |
|---|---|---|
| EP | 1085176 | 3/2001 |
| JP | 2584199 | 2/1997 |
| JP | H09324706 | 12/1997 |
| JP | H1068358 | 3/1998 |
| JP | 2001329879 | 11/2001 |
| JP | 2011518280 | 6/2011 |
| WO | WO 96/32583 | 10/1996 |
| WO | WO 2008103111 | 8/2008 |
| WO | WO 2010/006323 | 1/2010 |

* cited by examiner

HIGH EFFICIENCY HOT WATER PRESSURE WASHER

This U.S. Non-Provisional Patent Application claims the benefit of priority from U.S. Provisional Patent Application Ser. No. 62/110,158, filed Jan. 30, 2015, and U.S. Provisional Patent Application Ser. No. 62/120,452, filed Feb. 25, 2015, the entire disclosures of which are hereby incorporated by reference in their entireties.

FIELD

The present disclosure is related to combinations of technologies that significantly improve operational efficiency coupled with greatly reduced noxious emissions and reduced temperatures of exhaust gases. In certain embodiments, these technologies are incorporated into hot water pressure washing devices.

BACKGROUND

Cleaning devices are often used to clean items, such as motor vehicles, walls, decks, sidewalks, etc. Such devices are usually mobile and are used at the site of a cleaning job. As is understood by those working in the art, cleaning fluids used in such devices typically consist of a mixture of heated water, steam, and/or a chemical solution that is delivered to an area or article to be cleaned. While heated water, steam, and/or a chemical solution are typical fluids, other fluids or combination of fluids, are contemplated for use in embodiments of the present disclosure. In any case, fluid supplied to the cleaning wand assembly often and preferably is heated. That fluid temperature is preferably maintained over a variety of operating conditions.

A number of prior art devices are directed to certain aspects of the present invention. For instance, U.S. Pat. No. 4,142,496 to Saito et al. ("Saito"), which is incorporated herein by reference in its entirety, discloses an exhaust gas recirculation system for internal combustion engines to reduce nitrogen oxide emissions.

Similarly, U.S. Pat. No. 6,901,746 to Nishiyama et al. ("Nishiyama") discloses an exhaust gas recirculating circuit for mixing an exhaust gas into intake air, and is also incorporated herein by reference in its entirety. Nishiyama provides an exhaust gas recirculating circuit adjusting valve and controller that recirculates a predetermined amount of the exhaust gas for reducing NOx (nitric oxide (NO) and nitrogen dioxide ($NO_2$)) when the absorbed NOx accumulation amount is a predetermined value or less, and recirculates the aforementioned predetermined amount or more of exhaust gas to bring an air fuel ratio into a rich state when the adsorbed NOx accumulation amount exceeds a predetermined value and is to be released.

SUMMARY

In various embodiments of the present disclosure, significant operational improvements in hot water pressure washers are achieved by employing a combination of technologies including a forced air natural gas (FANG) burner that utilizes flue gas recirculation (FGR), and a flue heat exchanger (FHX) to reduce the temperature of the exhaust gases vented from the chimney, as shown and described herein. Carbon monoxide and NOx levels are significantly lowered and greatly improved operational efficiency is realized by such embodiments.

In certain embodiments, hot water pressure washers utilize a forced air natural gas burner that takes advantage of flue gas recirculation, which increases the temperature of the air in the combustion chamber. This reduces fuel costs associated with heating a cleaning fluid, for example, and increases overall efficiency. Such embodiments also result in the cleaning fluid being heated to a higher temperature. By utilizing a flue gas from the internal combustion engine in the combustion chamber, NOx and carbon monoxide emissions are greatly reduced.

Devices of the present disclosure, including hot water pressure washers, also utilize a flue heat exchanger which greatly lowers the temperature of exhaust gases. As a result of the lower exhaust temperatures achieved, lower cost materials can be used for the chimney that vents the exhaust gasses, and the devices are rendered useful in a wide of applications and environments.

In various embodiments of the present disclosure, heated exhaust gas is funneled through a flue gas recirculation line and is introduced into a combustion chamber of a forced air natural gas burner. A high pressure water heating coil in the combustion chamber delivers heated cleaning fluid to a cleaning wand, tool, or surface cleaner. The bulk of the exhaust gasses from the combustion chamber pass through a heat exchanger, greatly lowering the temperature of the exhaust gasses emitted from the chimney, while also heating the fluid(s). A portion of the exhaust gases are recirculated through the fuel gas recirculation line to the forced air natural gas burner. The combination of all of these components results in an extremely efficient hot water pressure washer with lower emission levels, lower exhaust temperatures, and improved operating efficiency.

In certain embodiments, flue gas recirculation is provided to pre-heat a working fluid, such as water to be further heated by additional components of the systems and thereby increase the overall efficiency of the system. In one embodiment, a flue heat exchanger device is provided with a fluid inlet and a fluid outlet. The fluid inlet provides a fluid of a first temperature to a bypass or similar device within the flue wherein exhaust gases passing through the flue are allowed to heat the fluid from the first temperature to a second temperature, the second temperature being greater than the first temperature. The fluid outlet is connected to an inlet of a high pressure heating coil such that the high pressure heating coil is supplied with a fluid that is at least partially pre-heated. In certain embodiments, high pressure heating coils of the present invention are provided with a plurality of water inlets, and at least one of such inlets comprises an inlet for fluid from the flue heat exchanger. In alternative embodiments, pre-heated fluid from a flue gas heat exchanger is directed into a single fluid inlet for a high pressure heating coil. In such embodiments, pre-heated fluid from a flue gas heat exchanger is mixed or joined with an additional fluid prior to entering the heating coil.

A preferred embodiment of the present disclosure contemplates providing a single flue gas heat exchanger disposed directly and vertically above a combustion chamber and associated burner such that a convection heat source from the combustion chamber is provided as close as possible to the flue gas heat exchanger and heat transfer to a fluid to be pre-heated is maximized. In alternative embodiments, a plurality of flues and/or flue gas heat exchangers are provided in a heat exchanger of the present disclosure.

In one embodiment, a pressure washer for heating and pressurizing a fluid is provided. The pressure washer comprises a fluid flow path for heating a fluid, and the fluid flow path comprises a first heat exchanger and a second heat exchanger provided in series. The first heat exchanger comprises an exhaust gas heat exchanger with a fluid inlet and a fluid outlet, the fluid inlet is in fluid communication with a clean fluid source, and the fluid outlet is in fluid communication with a pump to convey the fluid to an inlet of the pump. The pump is operable to pressurize the fluid received from the first heat exchanger and comprises an outlet for conveying the fluid to a second heat exchanger. The second heat exchanger is provided within a combustion chamber, and the combustion chamber comprises a burner. The combustion chamber is connected to the first heat exchanger to allow an exhaust gas from the burner to vent to the first heat exchanger. The pressure washer comprises a flue gas recirculation line, wherein exhaust gas that is not vented to the first heat exchanger is conveyed as flue gas to a mixing chamber. The mixing chamber comprises a first inlet for ambient air and a second inlet for the flue gas. At least one of gas and air from the mixing chamber is combusted by the burner to provide thermal energy to the second heat exchanger, and thermal energy from the exhaust gas is vented to the first heat exchanger.

Various embodiments are disclosed herein. It will be expressly recognized, however, that various features that are shown and described with respect to certain embodiments and figures may be included or substituted into other embodiments, even if such combinations are not shown and herein. One of ordinary skill in the art will recognize that various feature and modifications as shown herein may be substituted into or combined with other embodiments, and the figures and discussion of certain embodiments and inventions provided herewith is not intended to be limiting.

DETAILED DESCRIPTION

Figure 1:
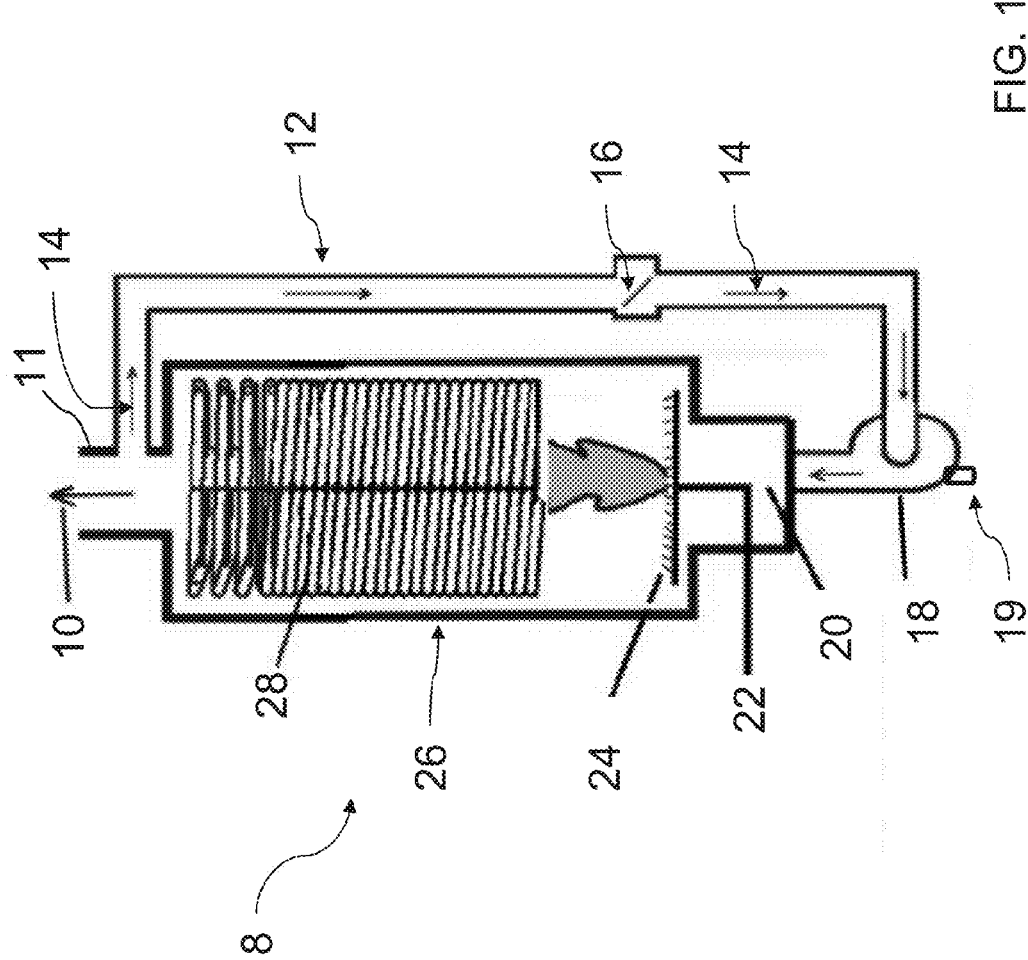
FIG. 1 is a schematic showing a flue gas recirculating burner for a pressure washer according to one embodiment of the present disclosure.

Referring now to the Figures, in which like reference numerals refer to structurally and/or functionally similar elements thereof, FIG. 1 shows a flue gas recirculating burner 8 according to one embodiment of the present disclosure. The burner 8 is particularly well adapted for use in pressure washers, but it will be understood that the present disclosure is not limited to devices for use with pressure washers or any other specific application or device. As shown in FIG. 1, the burner 8 produces an exhaust gas 10 which is generally vented from the system into a surrounding environment through a chimney or exhaust stack 11. Before exiting the system, a portion of the exhaust gas comprising a flue gas 14 is diverted through a flue gas recirculation line 12. The flue gas 14 is diverted from the exhaust outlet at least in part due to a blower 18 provided in the system. In certain embodiments, the blower 18 provides a pressure drop to draw the flue gas 14 to a desired location and allow it to be re-introduced into the system. The depicted embodiment uses a blower 18 to draw or pull flue gases from the exhaust stack 11 and forces the gases through a mixing chamber 20 to blend exhaust gas(es) with fresh air provided by at least one air intake 19 in the system, which is then re-burned within a combustion chamber 26. In the depicted embodiment of FIG. 1, the air intake 19 is provided as an inlet on the blower 18. It will be recognized, however, that the size and positioning of the air intake 19 may be varied and need not necessary comprise a feature of the blower 18 as shown in FIG. 1. The combustion chamber 26 comprises a gas line 22 and a burner ring 24 or similar burner element to provide thermal energy from gas combustion to a fluid heating coil 28 within which a working fluid is heated for use. The fluid heating coil 28 is preferably provided within the combustion chamber 26 and comprises, for example, a steel tubing or copper coil with a desired number of turns to achieve a surface area and subject a fluid carried therein to a desired exposure to thermal energy from the combustion and burner ring 24. In such a system, NOx emissions are lowered and a more efficient system is provided by way of the recirculation of the flue gas 14, which would otherwise be vented as exhaust 10, and further combustion of the flue gas 14 within the combustion chamber 26.

As shown in FIG. 1, the flue gas recirculation line 12 comprises a valve 16 for selectively controlling an amount of flue gas 14 that is allowed to recirculate and be re-introduced into a combustion process. In various embodiments, the valve 16 comprises at least one of a metering valve, a ball valve, a selective control valve, a globe valve, a sliding cylinder valve, and an angle valve (for example) to allow a user to selectively control a flow rate of flue gas 14 through the flue gas recirculation line 12.

Figure 2:
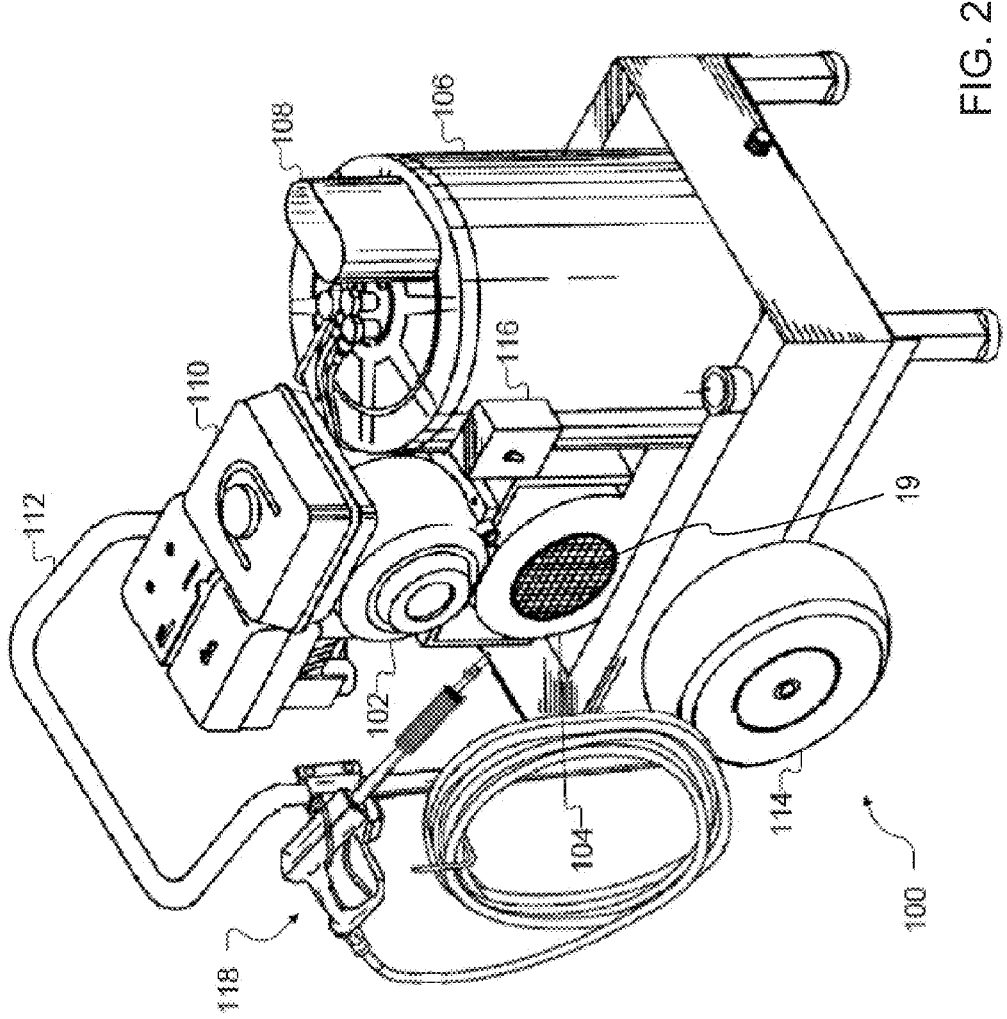
FIG. 2 is a perspective view of an improved pressure washer according to one embodiment of the present disclosure.

Referring now to FIG. 2, a pressure washer 100 is provided as one example of many different types and styles of hot water pressure washers, and is shown for illustrative purposes only and is not intended to be limiting in any way. Various hot water pressure washers may be mounted in trailers and pulled by vehicles, or provided as portable rolling units moved by hand as shown in FIG. 2. The pressure washer 100 of FIG. 2 comprises a blower unit 104 in communication with a combustion chamber 106. The combustion chamber 106 comprises an exhaust stack 108 for allowing exhaust gas(es) to vent from the chamber or 106. The device 100 further comprises a gas-powered engine 102 for driving at least one of a pump (not shown) and the blower 104, and additional system components as may be needed. A gas tank 110 is provided to store fuel for the motor 102 on board. A control unit 116, comprising at least a power switch is provided, and a spray gun 118 or wand is provided to selectively dispense pressurized and/or heated fluids. The pressure washer 100 of FIG. 2 preferably comprises a portable pressure washer device having a pair of wheels 114 and a handle 112, the handle 112 comprising a user-interface for manual manipulation and transportation of the device 100.

Figure 3:
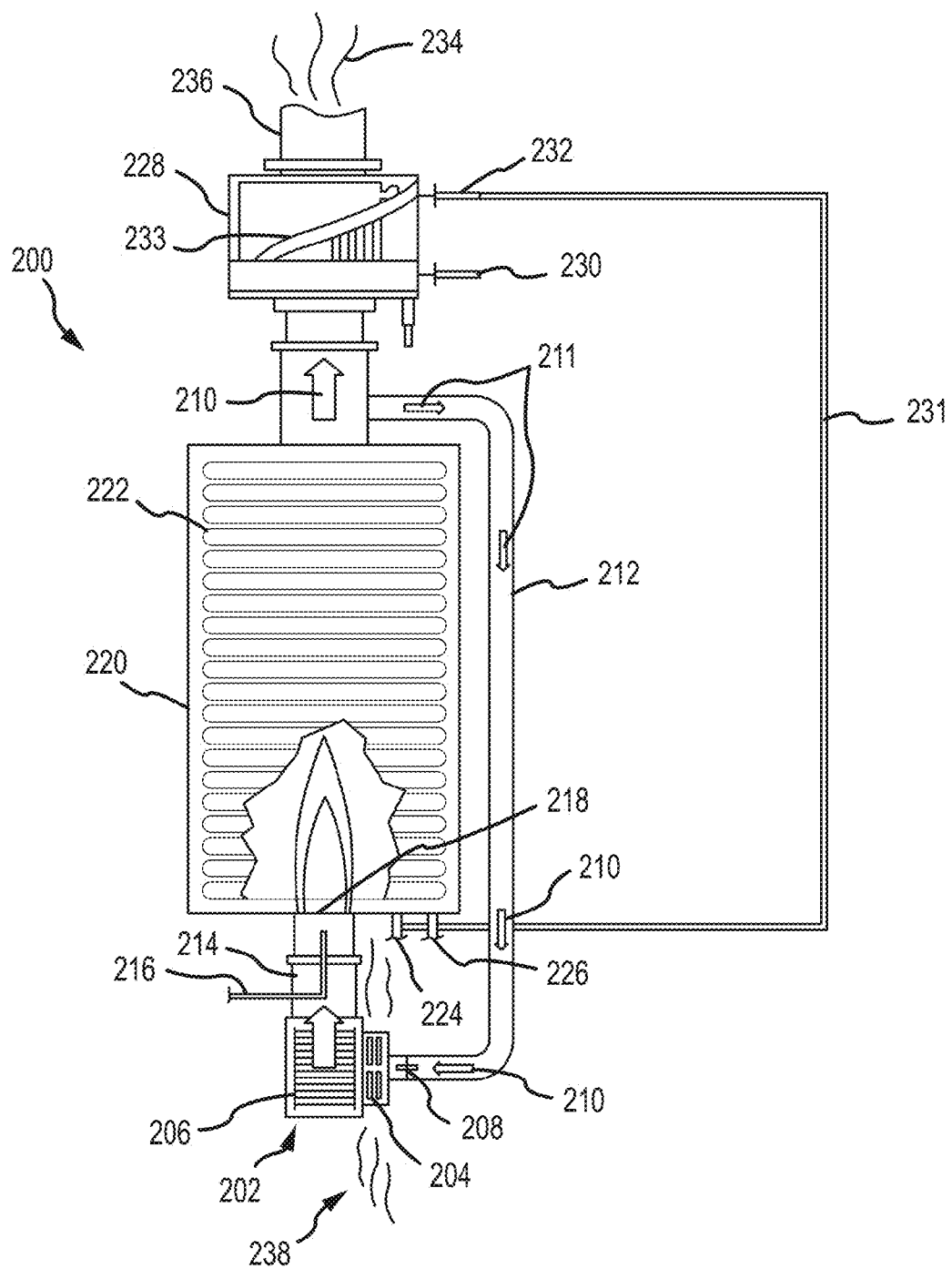
FIG. 3 is a schematic and partial cutaway view of system components in a pressure washer according to one embodiment of the present disclosure.

Features of the present disclosure, including the flue gas recirculation features of FIG. 1 (for example) are contemplated as being provided within a pressure washer of the arrangement shown in FIG. 2. In one embodiment, a pressure washer 100 as shown in FIG. 2 is provided with flue gas recirculation components as shown in FIGS. 1, 3 and/or 5, including a flue gas recirculation line 12 (not shown in FIG. 2) for directing a flue gas back to a point of combustion provided within the combustion chamber 106 as opposed to allowing all exhaust gases to exit through the exhaust stack 108. The blower 104 of FIG. 2 preferably comprises an air inlet 19 in the form of a side inlet for drawing in fresh ambient air from the surrounding environment. Additionally, a flue gas recirculation line 12 is provided to direct a flue gas to a mixing chamber 20 (see FIG. 1) provided downstream of the air inlet 19.

Although FIG. 2 depicts one embodiment and arrangement of a pressure washer 100 that is contemplated as comprising various flue gas recirculation features as shown and described herein, it will be expressly recognized that the present disclosure contemplates the provision of such features in various pressure washing device, and other devices, and that the arrangement, size, and inclusion or exclusion of additional features is not critical to the present disclosure and that the efficiency-enhancing features shown and described herein may be provided in various devices.

FIG. 3 is a schematic and partial cutaway view of an embodiment of FANG, FGR, and FHX components for provision in an improved hot water pressure washer of the present disclosure. The system 200 of FIG. 3 comprises a forced air natural gas (FANG) or fuel oil burner 202 comprising a fresh air intake 204 and a pump or fan 206. One commercially available FANG burner suitable for use with embodiments of the present disclosure includes, for example, the WAYNE Combustion Systems P250 gas burner. A damper 208 is provided, the damper 208 regulates an amount of flue gas 211 supplied by flue gas recirculation (FGR) line 212 that is mixed with fresh air 238 that flows into mixing chamber 214. A fuel line 216 adds fuel (typically natural gas or fuel oil) to the mixture of fresh air 238 and exhaust gases, which is ignited by burner 218. FGR is a highly effective technique for lowering NOx emissions from burners. Investigation has found that recirculating up to about 25% of the exhaust gas 210 through the FANG burner 202 lowers NOx emissions from about 40% to 55% of their normal levels. FGR lowers NOx in two ways: (1) the cooled, relatively inert, flue gas 211 acts as a heat sink, absorbing heat from the flame and lowering peak flame temperatures; and (2) the mixture of fresh air 238 with recirculated flue gas 211 lowers the average oxygen content of the air, starving the NOx-forming reaction of one of the needed ingredients. FGR also lowers carbon monoxide (CO) levels. The low emissions levels achieved by the system 200 preferably meet the California Department of Air Quality standards, and as a result, no permit is required to operate the device in certain locations and jurisdictions, such as the state of California.

In certain embodiments, a combustion chamber 220 contains at least one heating coil 222, which may comprise a high pressure fluid heating coil. Fluid enters coil 222 through a fluid inlet 224 and exits as a heated fluid through at least one fluid outlet 226. In certain embodiments, a portion of the exhaust or combusted material is drawn through FGR line 212 in the form of flue gas 211 by a pump or fan 206, and a remaining portion of the exhaust gas 210 passes into flue heat exchanger (FHX) 228. In various embodiments, the fan 206 comprises a user-interface or control mechanism such that an amount of gas drawn or diverted through the FGR line 212 can be selectively controlled or varied. A fluid is selectively supplied to the FHX 228 through a fluid inlet 230. That fluid travels through FHX coil 233, which conducts heat from the flue gas to the fluid traveling within the coil 233. The fluid is then preheated and exits through fluid outlet 232. In preferred embodiments, the fluid inlet 230 of the FHX 228 comprises a fresh water fluid inlet. The fluid is heated by the FHX 228 and preferably conveyed through the outlet 232 and the supply line 231 to an inlet 224 of the heating coil 222 for further heating. In such embodiments, the heating coil 222 comprises a final heating stage for a fluid prior to dispensing the fluid in cleaning operations (for example). In alternative embodiments, however, it is contemplated that the fluid is not passed in series from the first heat exchanger 228 to the second heat exchanger 222. In such embodiments, clean unheated fluid may be provided independently to the heating coil 222. One of skill in the art will recognize that engine efficiency and function is enhanced by features of the present disclosure even wherein the fluid is not passed directly from the first heating stage (e.g. FHX 228) to the second heating stage (e.g. heating coil 222).

In the embodiment shown in FIG. 3, a reduced temperature exhaust gas 234 exits out of exhaust stack 236. In a preferred embodiment, fluid (e.g. water) exiting through the fluid outlet 232 of the FHX 228 comprises a preheated fluid having a temperature that has been raised from an initial state, but is not necessarily fully heated to a final working temperature. Preheated fluid from the FHX is then preferably transferred from the FHX 228 to a high-pressure pump of an associated pressure washer and/or additional components of the system. In certain embodiments, preheated fluid is conveyed from the fluid outlet 232 by a supply line 231, which may comprise one or more pipes, tubes, conduits, etc. to a fluid inlet of the water tank or high pressure pump of the pressure washer and/or to a fluid inlet 224 of a heating coil 222. In such embodiments, thermal energy that would otherwise be vented directly out of the system and dissipated into the surrounding environment is captured in the form of a preheated fluid which is then conveyed to a heating coil, such that a pressure washer comprising the system 200 requires less work to heat a fluid in the coil 222 and the overall efficiency of the system is increased.

In addition to providing a pre-heating mechanism that takes advantage of existing thermal energy, the exhaust temperature of the system 200 of embodiments of the present disclosure is reduced by about 70% due to the FHX 228 heat scavenger system. The lower exhaust temperatures achieved allow for lower cost chlorinated polyvinyl chloride (CPVC) venting for chimney 236, and reduces risks associated with burning objects and individuals near the system 200. The efficiency and design of the system 200 is preferably Intertek compliant, is Green Leaf Mark certified, and meets efficiency standards set for federal and state tax credits. The improved system 200 of the present disclosure preferably meets the Environmental Protection Agency (EPA) emission levels to obtain the Department of Energy's annual fuel utilization efficiency (AFUE) energy efficient rating. The efficiency levels of hot water pressure washers can be increased from the current levels of 65-75% efficiency to about 95-98% efficiency by utilizing the improved combination of the FANG burner, FGR line, and FHX technologies shown and described herein.

Figure 4:
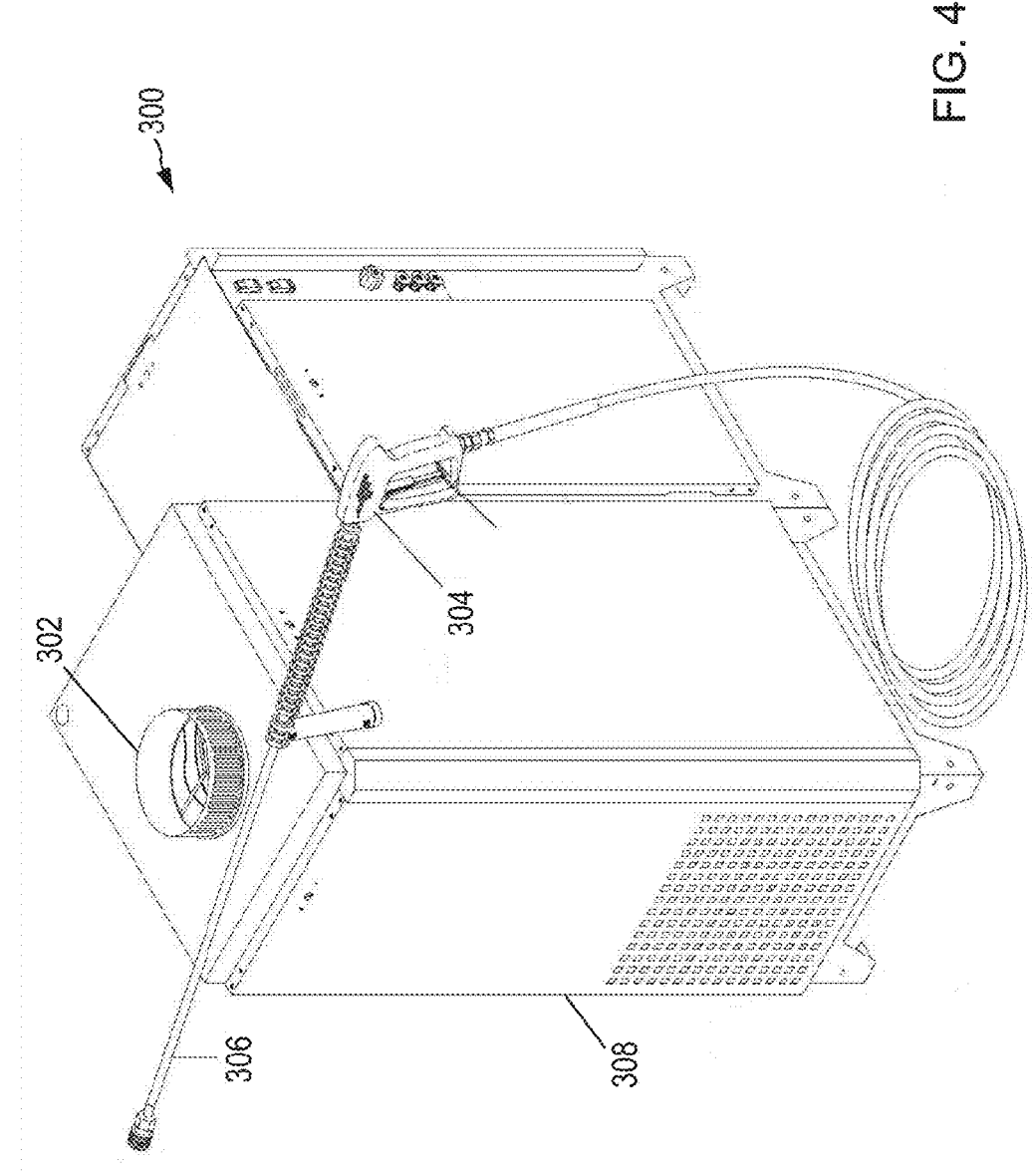
FIG. 4 is a perspective view of an improved pressure washer according to one embodiment of the present disclosure.

FIG. 4 is a perspective view of a pressure washer 300 according to one embodiment of the present disclosure. The pressure washer 300 comprises a burner exhaust 302, and a spray gun 304 interconnected to a wand 306. According to embodiments of the present disclosure, at least one of a FANG, FGR, and FHX component is interconnected to the burner exhaust vent, such that a fluid within the pressure washer is heated by exhaust gases. This heated fluid is ejected from the pressure washer through the spray gun 304 and subsequently through the wand 306, resulting in improved performance of the pressure washer. FIG. 4 depicts a pressure washer 300 that is generally in the form of a stationary or cabinet-style pressure washer. The body 308 of the pressure washer 300, in certain embodiments, comprises various features as shown and described herein. Specifically, it is contemplated that the pressure 300 comprises internal components including, but not limited to, a fluid flow path for heating a fluid, the fluid flow path comprising a first heat exchanger in the form of an exhaust gas heat exchanger and a second heat exchanger, the first heat exchanger and the second heat exchanger provided in series and wherein the second heat exchanger comprises a burner and a heating coil. The fluid inlet is in fluid communication with a clean fluid source, and the fluid outlet is in fluid communication with a pump to convey the fluid to an inlet of the pump. The pump is operable to pressurize the fluid received from the first heat exchanger and comprises an outlet for conveying the fluid to a second heat exchanger. A combustion chamber is connected to the first heat exchanger to allow an exhaust gas from the burner to vent to the first heat exchanger, and ultimately out of the exhaust vent 302. The combustion chamber also comprises a flue gas recirculation line, wherein exhaust gas that is not vented through the exhaust vent 302 is conveyed as flue gas to a mixing chamber. The mixing chamber comprises a first inlet for ambient air and a second inlet for the flue gas. At least one of gas and air from the mixing chamber is combusted by the burner to provide thermal energy to the second heat exchanger, and thermal energy from the exhaust gas is vented to the first heat exchanger. Such features are contemplated as being provided internal to the pressure washer 300, and are shown and described in more detail with respect to FIGS. 1, 3 and 5 (for example). FIG. 4 is provided to illustrate that such features may be provided in various different types, styles and arrangement of pressure washers and other devices, and no limitation with respect to specific pressure washer or similar devices is provided herein.

Figure 5:
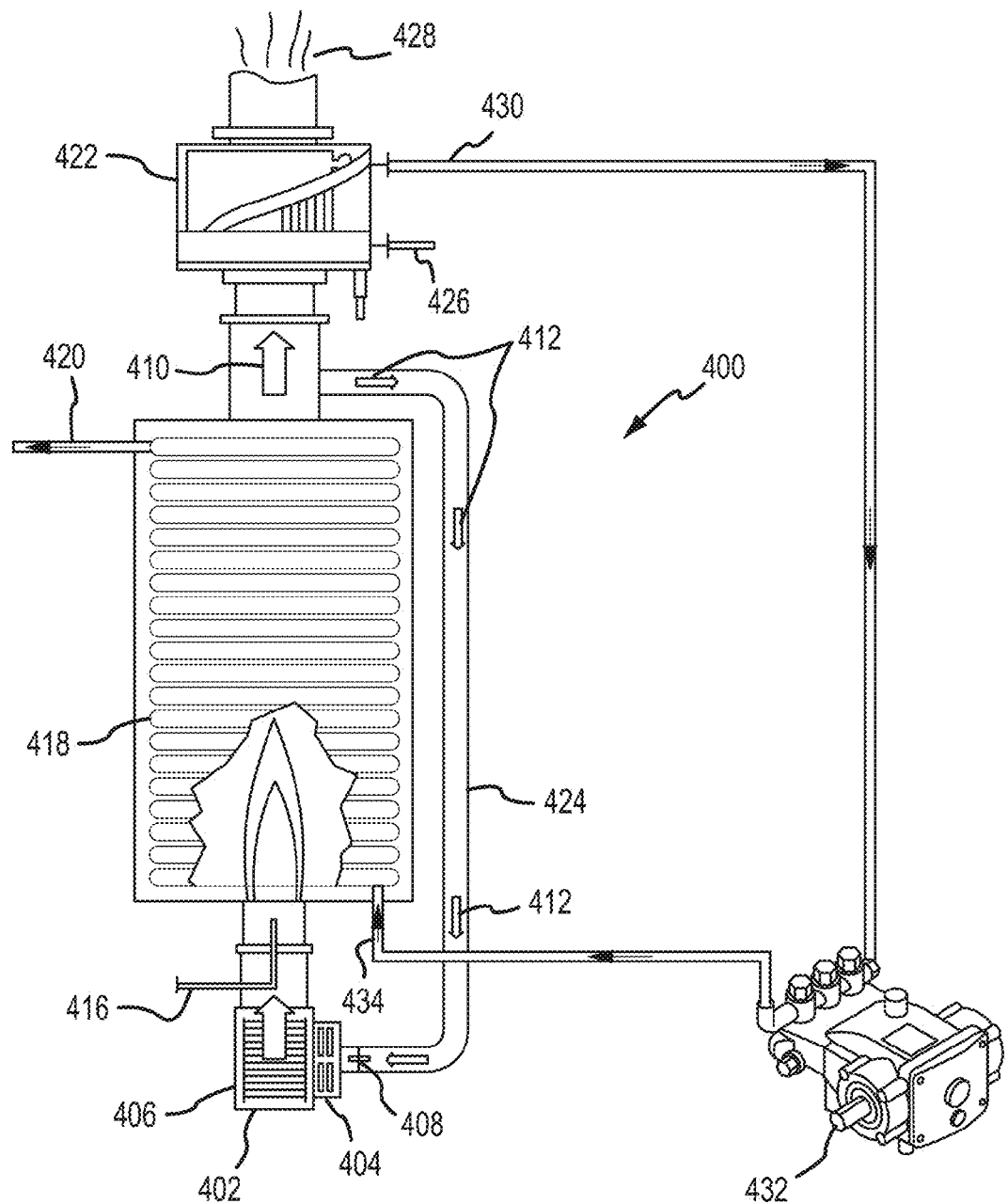
FIG. 5 is a schematic and partial cutaway view of system components in a pressure washer according to one embodiment of the present disclosure.

FIG. 5 is a schematic and partial cutaway view of another embodiment of the FANG, FGR, and FHX components for provision in an improved hot water pressure washer system in accordance with one embodiment of the present disclosure. Referring now to FIG. 5, a hot water pressure washer system 400 comprises a FANG burner 402 which has a fresh air intake 404 and a fan 406 or similar air mover. A damper 408 is provided to regulate an amount of flue gas 412 supplied by the FGR line 424 to a mixing chamber of the FANG burner 402.

In the embodiment shown in FIG. 5, a flue gas 412 is mixed with fresh air supplied by the fresh air intake 404. A fuel line 416 adds natural gas to the mixture of fresh air and exhaust gas, which is ignited by the FANG burner 402. The ignition of the mixture provides thermal energy to preheat water flowing through a high-pressure water coil 418; the pre-heated water or fluid is then conveyed out of the pressure washer through an outlet 420, and ultimately through a spray wand or similar device for dispensing fluids. An exhaust gas 410 from the combustion process is conveyed upwardly and allowed to vent to the FHX heat exchanger 422.

A FGR line 424 is provided to convey a flue gas 412 from the combustion process. The flue gas 412 from the ignited mixture is directed to the FANG burner 402 by the FGR line 424, while a second portion of the ignited mixture flows to the FHX heat exchanger 422. In the depicted embodiment, heat and exhaust gas 410 from the combustion process is provided to the FHX heat exchanger 422 to heat a fluid supplied from an inlet hose or conduit and a fluid inlet 426 of the FHX heat exchanger 422. The exhaust gas 410 is allowed to thermally interact with water from the inlet 426 and is ultimately vented as low temperature exhaust air 428 to the environment. The FHX heat exchanger 422 further comprises a fluid outlet 430 through which a heated fluid exits the heat exchanger 422. As shown in FIG. 5, a pump 432 is provided in a flow path between the fluid outlet 430 and an inlet 434 of the high-pressure water coil 418. The pump 432 is operable to pressure the fluid and maintain a flow of preheated water from the outlet 430 of the FHX heat exchanger 422 to the high-pressure water coil 418 of the FANG burner. After receiving thermal energy from the combustion process of the burner 402, fluid is directed away from the combustion chamber to a spray wand (not shown) or similar dispensing device. The embodiment of FIG. 5 comprises a pump 432 comprising any one of a plurality of pumps known to be suitable for use with pressure washing operations. Such pumps may include, but are not limited to a KARCHER™ Legacy horizontal shaft pressure washer pump. Alternatively, the pump 432 may comprise any pump suitable for conveying fluid from the outlet 430 of the heat exchanger 422 to the water coil 418. Such pumps may include, for example, peristaltic pumps, lobe pumps, positive displacement pumps, rotary pumps, gear pumps, centrifugal pumps, and various others as will be recognized by one of ordinary skill in the art.

Although not shown in FIG. 5, the system 400 is contemplated as further comprising an additional pump downstream of the outlet 430 of the water coil 418. In certain embodiments, the pump 432 shown in FIG. 5 comprises sufficient power and pressure to convey a pressurized fluid through the coil 418. In further embodiments, a pump is provided downstream of the outlet 420 of the heating coil 418, in addition to or in lieu of the first pump 432.

What is claimed is:

1. A pressure washer for heating and pressurizing a fluid, the pressure washer comprising:
   a fluid flow path for heating a fluid, the fluid flow path comprising a first heat exchanger and a second heat exchanger, the first heat exchanger and the second heat exchanger provided in series;
   the first heat exchanger comprising an exhaust gas heat exchanger with a fluid inlet and a fluid outlet, the fluid inlet in fluid communication with a clean fluid source, and the fluid outlet in fluid communication with a pump to convey the fluid to an inlet of the pump;
   the pump being operable to pressurize the fluid received from the first heat exchanger and comprising an outlet for conveying the fluid to a second heat exchanger;
   the second heat exchanger provided within a combustion chamber, the combustion chamber comprising a burner;
   wherein the combustion chamber is connected to the first heat exchanger to allow an exhaust gas from the burner to vent to the first heat exchanger;
   wherein the pressure washer comprises a flue gas recirculation line, wherein exhaust gas that is not vented to the first heat exchanger is conveyed as flue gas to a mixing chamber;
   the mixing chamber comprising a first inlet for ambient air and a second inlet for the flue gas;
   wherein at least one of gas and air from the mixing chamber is combusted by the burner to provide thermal energy to the second heat exchanger, and wherein thermal energy from the exhaust gas is vented to the first heat exchanger.

2. The pressure washer of claim 1, wherein the second heat exchanger comprises a heating coil positioned proximal to the burner and wherein the heating coil comprises a flow path for the fluid.

3. The pressure washer of claim 1, the pressure washer further comprises at least one of a valve and damper to selectively control an amount of flue gas conveyed to the mixing chamber.

4. The pressure washer of claim 1, further comprising at least one of a motor, a pump, and a fan to draw flue gas through the flue gas recirculation line.

5. A pressure washer having increased operational efficiency, the pressure washer comprising:
- a pump for pressurizing a fluid, the pump comprising a fluid inlet and a fluid outlet;
- a combustion chamber comprising a first heating coil and an exhaust stack;
- the combustion chamber comprising a burner and an air intake associated with the burner;
- a heat exchanger connected to a second end of the combustion chamber, the heat exchanger comprising a fluid inlet and a fluid outlet and a second heating coil;
- a flue gas recirculation line operable to direct a flue gas from the exhaust stack to the burner, wherein gas from the combustion chamber is directed through the flue gas recirculation line to the burner and wherein the flue gas is allowed to mix with air from the air intake and is combusted in the combustion chamber to provide thermal energy to a fluid in the first heating coil;
- wherein the fluid is provided to the first heating coil of the combustion chamber as a pre-heated fluid from the second heating coil, and wherein the first heating coil comprises a fluid outlet for direction the fluid to a dispensing device.

6. The pressure washer of claim 5, wherein the burner comprises at least one of a forced air natural gas burner and a forced air oil burner.

7. The pressure washer of claim 5, further comprising at least one of a motor, a pump, and a fan to draw the flue gas through the flue gas recirculation line.

8. The pressure washer of claim 5, further comprising a secondary burner provided within the combustion chamber.

9. The pressure washer of claim 5, further comprising a damper provided in the flue gas recirculation line, the damper adapted to regulate an amount of flue gas supplied by the flue gas recirculation line to the burner.

10. The pressure washer of claim 5, wherein pump is provided downstream of the heat exchanger and upstream of the first heating coil.

11. The pressure washer of claim 5, wherein the dispensing device comprises at least one of a spray gun and a wand.

12. A pressure washer for heating and pressurizing a fluid, the pressure washer comprising:
- a first heat exchanger comprising a fluid inlet, a fluid outlet, and a first heating coil connected to the fluid inlet at a first end and the fluid outlet at a second end, the first heat exchanger operable to receive an exhaust gas and subject a fluid to heat from the exhaust gas;
- the first heating coil in fluid communication with a pump, the pump operable to pressurize a fluid from the fluid outlet of the first heat exchanger;
- the pump comprising a fluid inlet in fluid communication with the first heating coil and a fluid outlet in fluid communication with a second heat exchanger provided within a combustion chamber;
- the combustion chamber comprising a burner for generating thermal energy, and wherein the burner provides the exhaust gas to the first heat exchanger;
- wherein a first portion of the exhaust gas is vented into the heat exchanger and a second portion of the exhaust gas is provided as a flue gas to a flue gas recirculation line;
- a mixing chamber provided in communication with the combustion chamber and adapted to allow mixing of the flue gas and ambient air;
- wherein fluid is provided to the first heat exchanger via the fluid inlet and heated in the first heating coil by the exhaust gas, and wherein the fluid exiting the fluid outlet of the first heat exchanger is conveyed to an inlet of the second heat exchanger by the pump.

13. The pressure washer of claim 12, wherein the second heat exchanger comprises a heating coil.

14. The pressure washer of claim 12, wherein the flue gas recirculation line comprises a first end and a second end, the first end connected to the combustion chamber such that the flue gas is directed to the flue gas recirculation line prior to reaching the first heat exchanger.

15. The pressure washer of claim 12, wherein the flue gas recirculation line comprises at least one of a damper and a valve for regulating a flow of flue gas to the mixing chamber.

16. The pressure washer of claim 12, further comprising at least one of a motor, a pump, and a fan to draw flue gas through the flue gas recirculation line.

17. The pressure washer of claim 12, further comprising a forced air natural gas or forced air oil burner, the forced air natural gas or forced air oil burner containing the combustion chamber.

18. The pressure washer of claim 12, further comprising a fuel line connected to the burner and wherein the burner combusts a combination of fuel supplied by the fuel line, a flue gas, and ambient air.

19. The pressure washer of claim 12, wherein the second heat exchanger comprises a fluid outlet for conveying heated fluid from the second heat exchanger and the combustion chamber.

20. The pressure washer of claim 19, further comprising at least one of a spray gun and a dispensing wand interconnected to the fluid outlet.

* * * * *